United States Patent [19]

Gloss et al.

[11] Patent Number: 4,620,420
[45] Date of Patent: Nov. 4, 1986

[54] DEVICE FOR REDUCING DRIVE SLIP OF MOTOR VEHICLES PROVIDED WITH TURBO CHARGED ENGINES

[75] Inventors: Erwin Gloss, Korntal; Gerhard Lotterbach, Markogroeningen; Egbert Perenthaler, Stuttgart; Manfred Schenk, Schorndorf; Jan F. van Woudenberg, Schweiberdingen; Udo Zucker, Boennigheim, all of Fed. Rep. of Germany

[73] Assignee: Robert Bosch GmbH, Stuttgart, Fed. Rep. of Germany

[21] Appl. No.: 675,333

[22] Filed: Nov. 27, 1984

[30] Foreign Application Priority Data

Dec. 12, 1983 [DE] Fed. Rep. of Germany ....... 3344819

[51] Int. Cl.$^4$ ............................................. F02B 37/00
[52] U.S. Cl. ....................................... 60/602; 60/605; 74/860; 123/564; 180/197
[58] Field of Search ................. 60/600, 601, 602, 603, 60/605; 123/559, 564, 416, 417; 74/860; 180/197

[56] References Cited

U.S. PATENT DOCUMENTS 3,776,355 12/1973 Scherenberg ...................... 180/197
4,245,604 1/1981 Lahiff ................................... 74/860
4,346,625 8/1982 Latsch .................................. 74/860
4,372,119 2/1983 Gillbrand ............................. 60/600
4,432,430 2/1984 Lind .................................... 180/197
4,463,565 8/1984 Rydquist ............................. 60/602
4,484,555 11/1984 Miura .................................. 74/860
4,508,088 4/1985 Hasegawa ........................... 74/860

Primary Examiner—Douglas Hart
Attorney, Agent, or Firm—Michael J. Striker

[57] ABSTRACT

A device for reducing slip of drive wheels of a motor vehicle having a turbo charged internal combustion engine includes a charger control unit which controls or regulates the charged air in dependency on at least rotary speed of the engine and in addition on information about the shifted gear in the transmission of the vehicle. For each gear change a maximum permissible time change of rotary speed or in dependency on the rotary speed a maximum permissible charge air pressure is determined experimentally and the latter values are stored in a storing device. By comparing the stored values with the actual values an optimum acceleration of the engine can be obtained. By a simultaneous adjustment of the ignition time point or of the amount of supplied fuel the speed of response of the entire arrangement is further increased.

5 Claims, 5 Drawing Figures

DEVICE FOR REDUCING DRIVE SLIP OF MOTOR VEHICLES PROVIDED WITH TURBO CHARGED ENGINES

BACKGROUND OF THE INVENTION

The present invention relates to a device for use in connection with a motor vehicle provided with an internal combustion engine operated by pressure charging, the device affecting the charge-air pressure of the pressure charging unit in dependency on at least the rotary speed of the engine.

From the German publication DE-OS No. 31 29 686 (PCT No. 82/00140) a device of this kind is known in which the desired value of the charging air pressure is additionally adjustable in dependency on load conditions of the internal combustion engine.

For motor vehicles equipped with turbo charged engines, especially high output vehicles such as racing cars, it has been found that it is frequently very difficult in lower gears to accelerate the car without slippage of the driving wheels. This problem results not so much from the absolute magnitude of the torque but from the course of the torque versus rotary speeds. This relationship is illustrated in the diagram of FIG. 1 in which torque M is depicted in dependency on rotary speed for a suction engine (curve 1) and for a turbo charged engine (curve 2). The jump of torque occurring in a turbo charged engine particularly during a load change considerably impairs the controllability of the motor vehicle especially in taking curves.

Conventional designs for reducing slippage of drive wheels are based on the detection of a slip, for example by comparing rotary speed between driven and driving wheels of the motor vehicle. In order to reduce the slip either the ignition (for example in the DE-OS No. 23 22 368) or fuel mixing process (for example DE-OS No. 28 32 739) are controlled in order to reduce the torque applied to the driving axles.

SUMMARY OF THE INVENTION

A general object of the present invention is to reduce drive slip in motor vehicles provided with turbo charged engines.

An additional object of this invention is to utilize standard electronic fuel and ignition control device which are supplied with input variables for determining ignition timing, by using a single additional information, namely about the gear shift.

Still another object of this invention is to provide such a slip reducing device which is inexpensive to manufacture and extremely reliable in operation.

A further object of this invention is to keep the engine in an advantageous operational range without any increased emission of exhaust gas.

An object of this invention is also to achieve optimum acceleration values with very simple means.

Furthermore, an object of this invention is to essentially improve the behavior of the motor vehicle in curves.

In keeping with these objects and others which will become apparent hereafter, one feature of the invention resides, in a device for reducing drive slip of a motor vehicle having a turbo charged internal combustion engine, driving wheels and a transmission between the driving wheel and the engine, in the provision of means for detecting information about the gear shift condition of the transmission, and means for controlling charging air pressure in dependency on engine variables and on the detected gear shift information.

The advantage of this arrangement is the fact that only a single additional input variable, namely the gear shift information is necessary apart from input variables applied to an electronic control unit for determining ignition timing and/or the amount of injected fuel. The sensor for the gear shift information in the simplest case is a switch which is inexpensive and very dependable in operation. The engagement for the slip reduction results particularly from the charging air pressure and consequently the engine remains in an advantageous operational range and no increased emission of exhaust gas will occur. With the provision of the device of this invention, optimum acceleration values can be achieved with minimum expenditures and the driving behavior of the motor vehicle in curves is distinctly improved. In contrast to conventional concepts, the invention is suitable also for motor vehicles without free running axle (such as four wheel drive vehicle having locking differentials).

It is of particular advantage when the charging air pressure of the engine is regulated or controlled in dependency on the changes of the rotary speed whereby maximum values of the rotary speed changes are compared with the actual values in dependency on the shifted gear.

In a particularly simple embodiment of this invention the charging air pressure is directly connected in response to the rotary speed and the information about the gear shift. This solution is particularly inexpensive to manufacture and is suitable primarily for the additional installation of the device of this invention in a motor vehicle having a turbo charged engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
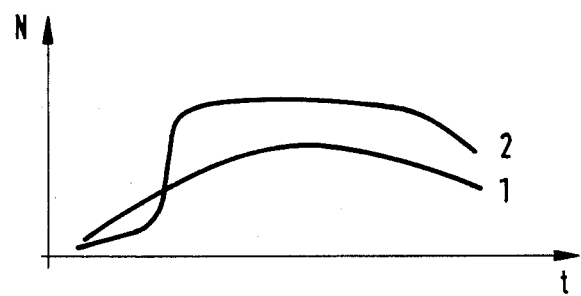
FIG. 1 is a plot diagram comparing torques of a suction engine and a turbo charged engine in dependency on rotary speed.
Figure 2:
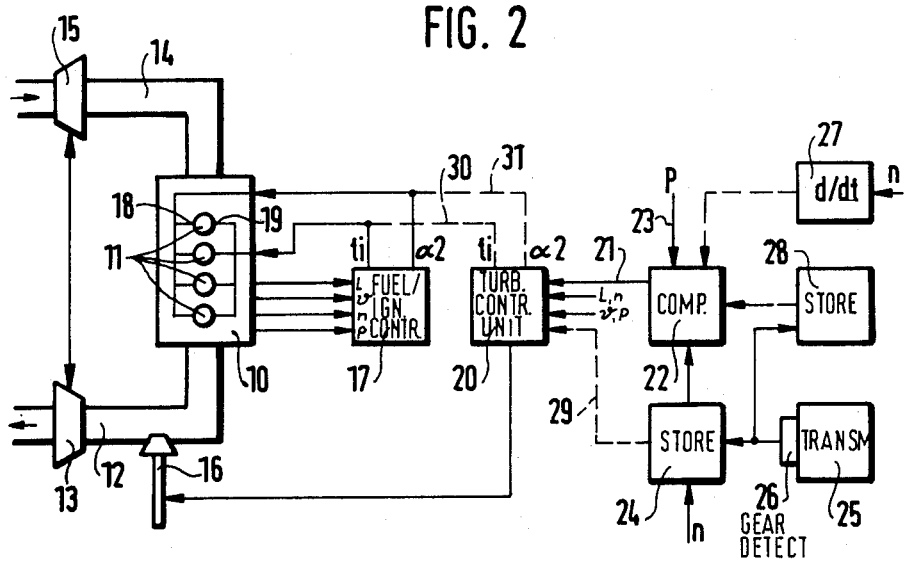
FIG. 2 is a schematic clock circuit diagram of an embodiment of the device of this invention and of a modification thereof shown in dashed lines.

FIG. 1 shows a torque jump (curve 2) of a turbo charged internal combustion engine without the device of this invention in comparison with the continuous course of the torque of the suction angine (curve 1) as a function of rotary speed increasing proportionally to time T. In the embodiment of the device for reducing drive slip of turbo charged IC engines as illustrated in FIG. 2, reference numeral 10 denotes an internal combustion engine which in this example has four cylinders 11. Combusted air-fuel mixture is discharged from the engine 10 through exhaust gas pipe 12. Exhaust gas drives an exhaust gas turbine 13 which is connected to another turbine 15 arranged in the air intake pipe 14 for a building up charge air pressure. In addition exhaust gas pipe 12 includes upstream of the turbine 13 a control valve 16 by means of which the exhaust gas pressure before the turbine 13 and thus also the rotary speed of the exhaust gas turbine 13 can be reduced.

A fuel and ignition control device 17 has inputs for receiving different operational variables of the internal combustion engine such as load L, temperature of sucked-in air or of the engine (delta), rotary speed value n or in addition the information about charge air pressure p; the outputs of the control device 17 deliver control magnitudes for fuel metering and for ignition timing. Inasmuch as in this example the internal combustion engine has an externally supplied ignition and a fuel injection device, the control device 17 delivers output pulses for activation of spark plugs 18 and of fuel injection valves 19.

A turbine control unit 20; indicated in this example as a separate unit, can be an integral part of the fuel and ignition control device 17. The turbine control unit 20 serves for controlling the turbine control valve 16. The control unit 20 has a plurality of inputs through which principally the same engine variables are applied as to the inputs of the control device 17. In addition, output signals from a comparator 22 are applied via conduit 21 to the turbine control unit 20.

In an embodiment, the actual value of charged air pressure p is applied via conduit 23 to one input of the comparator and the desired value of charged air pressure is applied to the comparator from a storing device 24. The storing device 24 stores desired values of charged air pressure in dependency on rotary speed of the engine and also in dependency on the gear shift in a transmission 25. Information about a shifted gear in transmission 25 is detected in simplest case by a switch 26 and the signal from the switch is applied to the desired value storing device 24.

In a modification of the device of this invention, indicated by dashed lines, signals from a differentiator 27 are applied to the input of the comparator 22. The differentiator is controlled by signals proportional to rotary speed n of the engine. Another input of the comparator 22 receives information about desired values from another storing device 28 in which values for a maximum permissible change in time of rotary speed are stored. This storing device 28 is again controlled by a signal from the switch 26 indicative of the momentary gear shift in the transmission 25.

In still another embodiment the turbine control unit 20 is controlled directly by the first-mentioned storing device 24 via a conduit 29. In this variation, the comparator 22 and the input conduits 23 feeding the information about actual charged air pressure, can be dispensed with.

Furthermore, in all above-described embodiments there is the possibility that the spark plugs 18 and fuel injection valves 19 can be controlled not by the control device 17 but by the turbine control unit 20 as indicated by dashed-lines 30 and 31.

For the sake of clarity components 23, 24, 28 and 27 are illustrated in FIG. 2 as separate blocks, nevertheless, these components, similarly as the control unit 20, can be integrated in the control device 17. It is immaterial for the purposes of this invention whether the individual functional groups are designed as analog signal processing electronic units or whether they are digitalized and processed by a computer. To those skilled in the art of electronic control and regulation in internal combustion engines, there is no problem to design the embodiment of this invention in an analog manner or in digital version carried out for example by a microcomputer.

The above described arrangement according to this invention functions as follows:

Fuel and ignition control device 17 generates, in dependency on different variables of the internal combustion engine such as for example the load L, temperature (delta), rotary speed n, or charged air pressure p or other output parameters, signals for controlling fuel injection valves 19 and spark plugs 18. In the case of a diesel engine, instead of ignition timing the start of injection is regulated by the device 17. By means of turbine control unit 20 to which all aforementioned engine variables or parameters are also applied, charging air pressure p of the internal combustion engine is controlled at least in dependency on the rotary speed n by means of the turbine control valve 16.

In order to streamline the curve 2 of FIG. 1 which normally corresponds to a torque jump typical for turbo charged engines and which causes principal drive slip problems in the motor vehicle, there are provided in accordance with this invention, a comparator 22 having an input connected to a sensor for the actual charged air pressure p, another input connected to a storing device 24 storing the desired values of the charged air pressure and still another input connected to a sensor (switch) 26 of the gear shift of the transmission 25.

In comparator 22, the actual and desired values of the charged air pressure p are compared. In doing so, it is essential that the rotary speed dependent desired values of the charged air pressure stored in the storing device 24 be discerned according to the employed gear. If the actual value of the charged air pressure exceeds the desired value read out from the storing device 24, then the turbine control unit 20 opens the control valve 16. As a consequence, only part of exhaust gas is employed for driving the exhaust gas turbine 13 which in turn causes at the air intake side of the engine a pressure drop in the air intake pipe 14. For low gears at which the torque of the engine is directly transmitted to the driving wheels of the vehicle and hence a higher risk of slippage is present, the charged air pressure in a critical range of rotary speed is limited preferably to lower pressures values than those for higher gears. The graduation of the desired value of the charged air pressure in dependency on the employed gear shift and with rotary speed as a variable, is made with advantage in such a way that for all gear shifts the course of torque versus rotary speed is approximately the same.

In a preferred embodiment of this invention, the actual value of the time change of the rotary speed in the form of an output signal from a differentiator 27, and a maximum desired value of the rotary speed change from another storing device 28 is applied to the inputs of the comparator 22, instead of the beforedescribed actual and desired charged air pressures. In the additional storing device 28, there is stored a maximum permissible value of change in time of the rotary speed which has been experimentally determined in dependency on respective gears of the transmission; such a maximum permissible rotary speed change value corresponds for example to a value for an optimum acceleration on a non-skid road. During the driving of the motor vehicle, particularly in the case of accelerations, the charged air pressure is limited by the turbine control unit 20 and the valve 16 in such a manner that the permissible rotary speed change whose value is stored in the storing device 28, is never exceeded. Information about the employed gear in transmission 25 is supplied via the sensing switch 26 to the storing device 28. Instead of switch 26, there can be employed also separate contacts for each gear or logic data from an automatic transmission control. In another example, it is also sufficient to detect the lower gears only inasmuch as in the higher gears generally a negligible slippage can be expected.

In another, particularly simple embodiment of this invention, only the desired charged air pressure values from the storing device 24 are supplied via conduit 29 into the turbine control unit 20. This embodiment provides a pure control of the turbine valve 16 in dependency on the rotary speeds n and the changed gear. It is true, that in this solution changes of different ambient variables such as air pressure and the like, might lead to errors in the charged air pressure control, it has been found that this unmixed control is sufficient when rather low cost and fast realization are preferred than high requirement for accuracy.

Figure 3A:
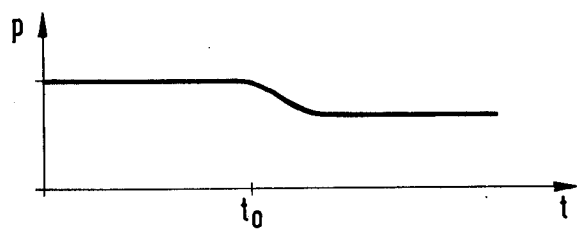
FIGS. 3A and 3B show plot diagrams explaining the operation of the device of this invention.
Figure 3B:
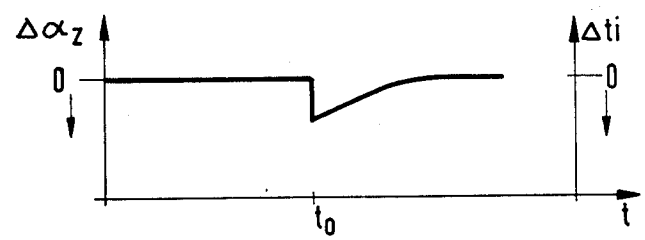

The diagram in FIG. 3A shows a time plot of charged air pressure and the diagram in FIG. 3B illustrates the corresponding time plot of the change of ignition angle or the change of the injection time. If at a time point $T=T_o$ is recognized that the actual value of the charged air pressure or of the rotary speed change exceeds the assigned desired value and/or if at a time point $T=T_o$ the turbine control unit is activated then as shown in the diagram of FIG. 3A the charged air pressure value is reduced. As indicated by dashed line conduits 30 and 31 in FIG. 2, the turbine control unit 20 is capable of performing additional corrections of ignition timing or fuel metering or of mixture preparation. Since the charged air pressure cannot be controlled or regulated by the control valve 16 without a certain time delay, it has been found to be of advantage when under circumstances, for example, in the case of a charged air pressure drop (FIG. 3A) the power output of the internal combustion engine is simultaneously reduced. This power reduction can be accomplished by shifting the ignition time point by a value $\Delta\alpha_Z$ which after expiration of time period given by the mechanical inertia of the charger, is again restored to zero. It is also possible to reduce within the time interval $T_I$ (FIG. 3B) preset for fuel injection, the amount of injected fuel. In many cases it can be also of advantage to induce corrections by affecting both the ignition timing and the fuel metering.

Figure 4:
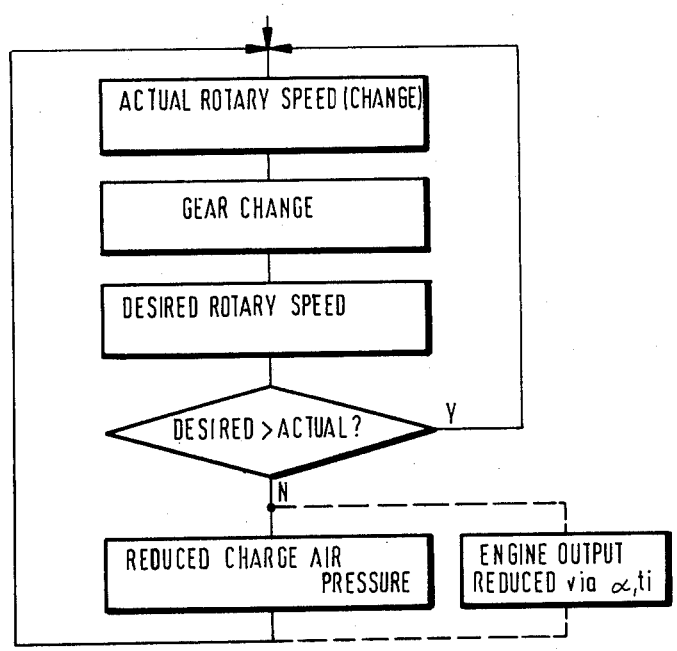
FIG. 4 is flow chart of a computerized embodiment of this invention.

FIG. 4 illustrates a flow chart of reducing charged air pressure for slip reduction by means of a computerized control unit. In the first stage, the actual value of rotary or of the rotary speed change is determined. Then information about employed gear in the transmission is supplied to the computer and the desired value of the rotary speed or of the rotary speed change is retrieved from a storing device. In the next program stage the computer compares the actual and desired rotary speed values. If the desired value is greater than the actual value then the preceding program stages are repeated without reducing the charged air pressure. If however the desired value is less than the actual value, the charged air pressure is reduced and also the power output of the internal combustion can be momentarily lowered before a new regulating cycle starting with the determination of the actual value of the rotary speed or rotary speed change is initiated.

In practice, the device for reducing drive slip of a motor vehicle provided with a turbo charged engine has proved very successful and has guaranteed reliable control of the motor vehicle at optimum acceleration rates. Inasmuch as only a single additional input information of the employed gear shift is needed (all other input variables being anyhow required for the electronic ignition and/or fuel injection control apparatus), the application of the device of this invention is extremely cost effective. In addition, the device of this invention has a very high resistance against interference and only a minute probability of failure.

It will be understood that each of the elements described above, or two or more together, may also find a useful application in other types of constructions differing from the types described above.

While the invention has been illustrated and described as embodied in specific examples of arrangements for reducing drive slip of motor vehicles having turbo charged internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for reducing drive slip of a motor vehicle having a turbo charged internal combustion engine, drive wheels and a transmission between the drive wheels and the engine, the device comprising means for detecting information about engaged gear in the transmission, means for controlling charged air pressure of the engine in dependency on rotary speed of the engine and on the detected gear information, said controlling means including a device for storing desired values of charged air pressure, said desired values of charged air pressure being determined in dependency on the engaged gear at a rotary speed as a parameter in such a manner that the torque on an axle of at least one drive wheel is substantially independent from the engaged gear.

2. A device for reducing drive slip of a motor vehicle having a turbo charged internal combustion engine, drive wheels and a transmission between the drive wheels and the engine, the device comprising means for detecting information about engaged gear in the transmission, and means for controlling charged air pressure of the engine in dependency on rotary speed of the engine and on the detected gear information, said controlling means controlling or regulating the charged air pressure of the engine in dependency on the gear information used as a parameter and in dependency on the time-rate-of-change of the rotary speed.

3. A device as defined in claim 2, wherein the controlling means reduce the charged air pressure of the engine after a maximum permissible time-rate-of-change of the rotary speed of the engine has been exceeded.

4. A device as defined in claim 3, further comprising means for momentarily shifting the ignition time point of supplied fuel mixture in the retarded direction in response to the reduction of the charged air pressure in order to reduce slippage of the drive wheels.

5. A device as defined in claim 3, wherein in response to the reduction of the charged air pressure the amount of fuel supplied in the engine is momentarily reduced in order to reduce slippage of the drive wheels.

* * * * *